Figure 1:
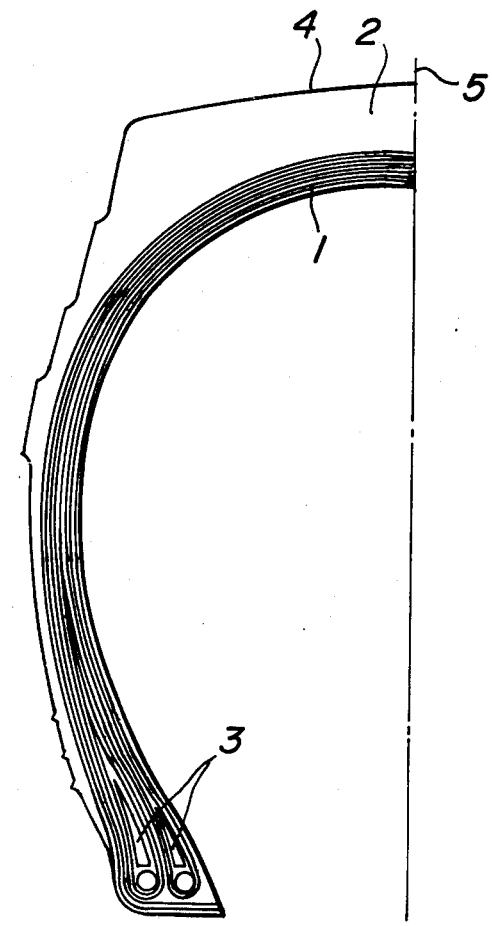

United States Patent [19]

Sakai et al.

[11] 4,296,790
[45] Oct. 27, 1981

[54] LIGHT TIRE BODIES USING THICK CORDS

[75] Inventors: Yoshihiro Sakai, Kawasaki; Ryosaku Tanaka, Akigawa; Toshio Kita; Munetoshi Shimotake, both of Kodairo; Tsuguyoshi Yamada, Higashimurayama; Hiroshi Ueda, Akigawa, all of Japan

[73] Assignee: Bridgestone Tire Company Limited, Tokyo, Japan

[21] Appl. No.: 104,217

[22] Filed: Dec. 17, 1979

[30] Foreign Application Priority Data

Dec. 27, 1978 [JP] Japan .................................. 53/159694

[51] Int. Cl.³ .......................... B60C 9/06; B60C 15/06
[52] U.S. Cl. ............................ 152/354 R; 152/357 R; 152/359; 152/362 R
[58] Field of Search .................... 152/330 R, 354–356, 152/357 R, 359, 374, 362 R, 362 CS

[56] References Cited

U.S. PATENT DOCUMENTS

| | | | |
|---|---|---|---|
| 3,674,078 | 7/1972 | Sasaki et al. | 152/330 R |
| 3,682,223 | 8/1972 | Simpson | 152/362 R |
| 4,193,437 | 3/1980 | Powell | 152/330 R X |
| 4,209,050 | 6/1980 | Yoshida et al. | 152/359 X |
| 4,244,414 | 1/1981 | Uemura et al. | 152/357 R |

Primary Examiner—John E. Kittle
Assistant Examiner—Lois E. Boland
Attorney, Agent, or Firm—Sughrue, Mion, Zinn, Macpeak & Seas

[57] ABSTRACT

A light tire body using thick cords is disclosed. The tire body comprises a bias-structured carcass composed of rubberized plies each including thick organic fiber cords. The rubber between the carcass plies has a thickness corresponding to $hm/ho \leq 0.5$ where $hm$ is an average rubber gauge between the plies at a center position in a widthwise direction of tire and $ho$ is a diameter of the thick cord, and is prepared from a compounding recipe of at least one rubber ingredient selected from natural rubber and diene rubbers, a softener, an organic vulcanization accelerator and sulfur as well as at least 30 wt.% of carbon black having an average iodine adsorption value of 40–90 mg/g and an average DBP absorption value of 60–140 ml/100 g, and has a dynamic modulus of elasticity $E'$ at 100° C. under 2% elongation given by $E' \geq 6.0 \times 10^7$ dyne/cm², a dynamic loss angle $\tan\delta$ given by $\tan\delta \leq 0.095$ and a tensile strength of not less than 100 kg/cm² as properties after vulcanization.

2 Claims, 2 Drawing Figures

LIGHT TIRE BODIES USING THICK CORDS

This invention relates to light tire bodies using thick cords. More particularly it is intended to achieve a weight-saving of tire bodies without obstructing the durability in pneumatic tires provided with a bias-structured carcass. The invention specifically relates to pneumatic tires for heavy vehicles such as a bus, truck and the like.

In the pneumatic tires for heavy vehicles, there has hitherto been provided a carcass composed of rubberized ply layers each containing relatively thin nylon cords of, for example, from 840 d/2 to about 1,260 d/2, which being usually formed by laminating 8 or more carcass plies one upon another so as to cross each other at a predetermined cord angle.

Such vehicles now run at a higher speed, as a result of the perfection of paved roads, improvement of transportation efficiency accompanied therewith and the like. Now, the tires provided with the carcass of the above type are constructed so that (i) the number of carcass plies required for holding the strength of the carcass under severe use conditions is large and hence (ii) the total amount of rubber to be interposed between the carcass plies becomes large. As a result, not only are they disadvantageous in the number of working steps, tire weight and cost, but also the result falls short of the expectations in heat durability, which particularly comes into question during the continuous running over a long distance at a high speed.

On the other hand, it is strongly required to primarily solve a significant subject for improving the productivity in the manufacture of the above tire. For this purpose, it has been attempted to decrease the number of carcass plies to be used by using relatively thick nylon cords of, for example, from 1,890 d/2 to 1,890 d/3 or more as a carcass ply to enhance the strength of the cords themselves, whereby the above mentioned disadvantages are intended to be solved.

The inventors have confirmed from various experiments that the above attempt is rewarded with good results in the productivity, tire weight, cost and particularly heat durability of tread portion, but there are resulting degradations of wear resistance as a most important performance in the tires of this type and fatigue resistance of the carcass. Therefore, the above attempt has not yet been put to practical use.

The inventors have made further examinations with respect to the causes of the above mentioned drawbacks and as a result, the following conclusions have been reached. First, when relatively thick nylon cords are used as a carcass ply and the tensile strength of the carcass is made equal to that of the conventional carcass composed of relatively thin nylon cord plies by reducing the number of carcass plies to thin the total gauge of the carcass, the behavior and shape of the carcass becomes different from the conventional carcass because the decrease of the rigidity in the carcass as the ply laminate is particularly extreme at the sidewall portions of the tire body. As a result, when the tensile strength of the carcass is merely the same, the use of thick cords could not impart the wear resistance equal to that of the conventional carcass using the thin cords.

On the other hand, a test for fatigue resistance was made with respect to test tire prepared only by applying a usual rubber gauge between plies or rubber gauge for ply coating to the relatively thick nylon cords. As a result, it has been confirmed that when the rubber between the plies was observed in detail by a microscope, electron microscope or the like at the last stage of fatigue life, particularly 70% fatigue life, a nucleus for the formation of separation is produced in the rubber layer near that portion having a thinnest rubber gauge between the cords of the crossed carcass plies. Further, it was ascertained that the growth of separation from that portion of separation nucleus causes fatigue failure.

Moreover, it has been found that the above phenomenon frequently occurs in the vicinity of the tread portion or further near the boundary between the turnup portion of the carcass ply and the apex rubber usually used for stiffening the turnup portion, particularly near the upper edge of the boundary or the upper part thereof.

In the former or tread portion, when the relatively thick cords are used for the carcass ply, the thinner the total gauge of the carcass, the space between the cords of the plies becomes smaller with respect to the cord diameter and hence the maximum shearing strain increases at that space, so that the growth of separation nucleus is strongly apt to be accelerated. In the latter or turnup portion, the deformation at the boundary between the turnup portion and the apex rubber becomes larger due to the decrease of the rigidity of each sidewall portion.

For this reason, there has been an increase of the rubber gauge between the cords in the ply laminate of the carcass, but this procedure is not adoptable because it is disadvantageous in the heat durability and brings upon the increase of weight and cost.

In addition, the rubber gauge between the carcass plies in the tread portion is usually rendered thicker toward the tread surface and hence thinner from the tread surface toward the inside of the tire, which is to prevent the local reduction of the fatigue resistance because the external force acting to the tire tread and the deformation accompanied therewith become larger near the tread surface. However, the tire temperature is higher near the tread surface. Therefore, if it is intended to thin the rubber gauge between the carcass plies disposed near the tread, which is advantageous in the heat degradation, the growth and promotion of separation nucleus due to the increase of the shearing strain appears considerably in that portion near the tread.

It is an object of the invention to advantageously solve the above mentioned problems of the prior art obstructing the weight-saving of tire and to realize the weight-saving of tire body with an effective improvement of productivity without accompanying the obstructions to the wear resistance and fatigue resistance.

As a result of various experiments and wide observations into the course of wear, it has been found that the composition of rubber for ply coating, particularly the compounding quantity and properties of carbon black is important with a relation of its gauge, particularly an average rubber gauge at a center position in a widthwise direction of the tire to a cord diameter of the thick cords constituting the carcass ply in order to achieve the object of the invention.

Throughout the specification, the term "thick cords" constituting the carcass ply includes nylon cords of from 1,890 d/2 to 1890 d/3 or more and organic fiber cords having a cord diameter equal to or larger than that of said nylon cord, such as polyester cords, rayon cords, vinylon cords and the like.

In the bias-structured carcass using such thick cords, rubber interposed between the carcass plies has such a thickness that a ratio of average rubber gauge (hm) between the mutual plies embedded in the rubber body of the tire at a center position in the widthwise direction of the tire to cord diameter (ho) of the thick cords is $hm/ho \leq 0.5$, preferably $hm/ho \leq 0.45$.

The term "rubber gauge between the plies" used herein is defined by a minimum space between the cords crossed with each other at the ply laminate mutually superimposed one upon another. Particularly, the average rubber gauge is called into question due to the fact that the rubber gauge between the plies near the tread is usually selected so as to be thicker than that in the inner plies as mentioned above.

In the practice of the invention, it is more desirable to select a ratio of the average rubber gauge (hm') between two or three plies extending from the outermost ply toward the inside of the carcass to the cord diameter (ho) of the thick cords within a range of 0.2-0.7, preferably 0.3-0.55.

The rubber body between the plies is composed of at least one rubber selected from natural rubber and diene synthetic rubbers or a rubber blend thereof, which is compounded with carbon black as defined below in addition to ordinary compounding ingredients such as softener, organic vulcanization accelerator, sulfur and the like. The carbon black must have an average iodine adsorption value of 40-90 mg/g and an average dibutyl phthalate (DBP) absorption value of 60-140 ml/100 g, and should be compounded in a quantity of at least 30% by weight, preferably not less than 32% by weight per the rubber ingredient.

With the above rubber compounding, particularly the use of the selected carbon black, the fatigue resistance of the carcass is advantageously improved without increasing the rubber gauge between the plies. Thus, the compounded carbon black is existent in a route of the growth of the separation nucleus, so that this route is zigzaged and the formation of the nucleus is suppressed at minimum.

In the above defined rubber composition according to the invention, a dynamic modulus of elasticity (E') measured at 100° C. under 2% elongation must be given by $E' \geq 6.0 \times 10^7$ dyne/cm$^2$, preferably $7.8-8.0 \times 10^7$ dyne/cm$^2$ as a property after vulcanization, whereby the wear resistance of the tire using the thick cords is improved without increasing the total gauge of the carcass. In particular, the durability of the bead portion is improved.

Further, the rubber composition after vulcanization has a tensile strength at 100° C. of not less than 100 kg/cm$^2$, preferably not less than 120 kg/cm$^2$, which is required to prevent the growth of separation nucleus and to suppress the formation of the nucleus at minimum, and a dynamic loss angle tan$\delta$ at 100° C. of not more than 0.095, preferably not more than 0.080, which is advantageous to suppress the growth of separation nucleus.

Regarding the dynamic modulus of elasticity, a ratio of the dynamic modulus of the apex rubber for stiffening the turnup portion of the carcass to that of the rubber body between the plies is selected to be within a range of 0.9-1.3, preferably 1-1.1, whereby the concentration of strain, which is frequently apt to occur in the vicinity of the boundary between the turnup portion and the apex rubber, can be avoided to prevent the formation and growth of separation nucleus.

The reason why the ratio of the average rubber gauge hm between the plies at the center position in the widthwise direction of tire to the cord diameter ho is $hm/ho \leq 0.5$ is based on the following. That is, even when the ratio hm/ho exceeds 0.5, the maximum shearing strain near the boundary between the cord and the rubber is naturally small and the rigidity as the ply laminate is well-balanced, so that the troubles in the conventional carcass using thin organic fiber cords do not result, but the use of thick cords according to the invention has such drawbacks that the total gauge of the carcass becomes thicker and the heat durability of the tread is deteriorated.

The reason why the quantity of carbon black to be compounded with the rubber for the carcass ply coating is limited to not less than 30% by weight is as follows. As a result of detailed observations on the fatigue failure surface of the tire, it has been confirmed that the fatigue failure occurs in the rubber layer near the cords, but the probability of developing carbon black in the failure surface is very small and near zero. Now, the inventors prepared tires by varying only the quantity of carbon black in the rubber compounding and checked their fatigue failure states. As a result, the optimum quantity of carbon black could not be determined from the failure surface area because the heat build-up, modulus of elasticity and tensile strength were also changed in accordance with the variation of carbon black quantity. However, the inventors have found from exhaustive surface observations that the roughness of the failure surface increases when the quantity of carbon black is not less than 30% by weight, resulting in the fact that the apparent failure surface area is small as compared with the surface area estimated from the variation of the properties.

The reason why the dynamic loss angle tan$\delta$ at 100° C. of the rubber for coating the plies each composed of organic fiber cords is limited to not more than 0.095 is based on the following fact. That is, when tan$\delta$ exceeds 0.095, heat build-up inside the tire increases to raise the tire temperature, so that not only the heat durability is deteriorated, but also the fatigue of rubber is encouraged and the tensile strength is reduced, and consequently the growth of separation nucleus becomes larger.

The reason why the dynamic modulus of elasticity E' (2% elongation) at 100° C. of the rubber for coating the plies each composed of organic fiber cords is limited to not less than $6.0 \times 10^7$ dyne/cm$^2$ is based on the following fact. That is, when E' (2% elongation) is less than $6.0 \times 10^7$ dyne/cm$^2$, if the rubber gauge between the cords in the ply laminate is made small, the rigidity of the ply laminate is poor compared with that of the carcass using the relatively thin cords, so that the carcass deformation becomes large. Furthermore, the force for suppressing the carcass deformation with the advance of wear is poor, so that the wear resistance lowers. Moreover, the deformation of the bead portion becomes large, so that the stress concentration in the bead portion is increased to promote the growth of separation nucleus to thereby reduce the durability.

The reason why the tensile strength at 100° C. of the rubber for coating the plies each composed of organic fiber cords is limited to not less than 100 kg/cm$^2$ is due to the fact that even when the quantity of carbon black and the dynamic loss angle are within the above defined ranges, if the tensile strength at 100° C. is less than 100 kg/cm², the fatigue life aiming at the invention cannot be obtained as proved from experimental results.

The reason why the ratio of the dynamic modulus of elasticity E′ (2% elongation) between the rubber for coating the plies each composed of organic fiber cords and the apex rubber is limited to a range of 0.9-1.3 is as follows. When the cord diameter of the carcass ply is made large and the rubber gauge between the carcass plies is thinned, the rigidity of the carcass at the bead portion is reduced to make the deformation of the carcass large, so that a portion of the carcass contacting with a rim is subjected to damage by abrasion. As a result, it would be desirable to increase the values of E′ (2% elongation) in the ply coating rubber and apex rubber as far as possible, but E′ of the ply coating rubber is restricted from other properties of the carcass. Therefore, when E′ of the apex rubber is made larger than that of the ply coating rubber, the damage by abrasion is liable to be suppressed, but the different level of the rigidity is produced at the upper end of the apex rubber, so that the separation nucleus is apt to grow at the bead portion. On the other hand, when E′ of the apex rubber is smaller than that of the ply coating rubber, the rigidity of the bead portion reduces and the damage by abrasion is apt to be caused. And also, the separation nucleus is apt to grow due to the different level of rigidity like the former case. Judging from the above facts, the practical range of the ratio of dynamic modulus of elasticity between the ply coating rubber and the apex rubber is 0.9-1.3.

The thinner the rubber gauge between the carcass plies, the more the tire temperature lowers, so that the thinning of the rubber gauge is advantageous in view of the heat degradation and heat durability. Further, the degree of freedom for thinning the rubber gauge is large in the tread side where the rubber gauge between the carcass plies is particularly thick. If the rubber gauge becomes too thin, however, the shearing strain naturally increases and as a result, the growth of separation nucleus cannot be prevented even if the tensile strength of the rubber is sufficiently large. As a result of various examinations, it has been found that the weight, heat durability and fatigue durability are particularly well-balanced by limiting a ratio of average rubber gauge (hm′) between the plies near the tread side or between two or three plies extending from the outermost ply toward the inside of the carcass to the cord diameter (ho) to $0.2 \leq hm'/ho \leq 0.7$.

The invention will be described below with reference to an example based on the accompanying drawings.

Figure 2:
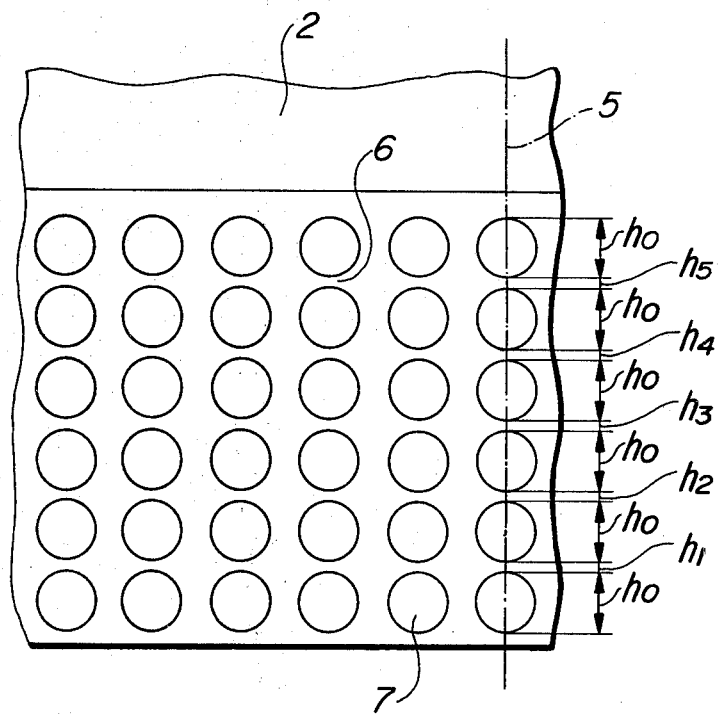

FIG. 1 is a schematic radial half section of a test tire having a size of 10.00-20 14PR; and FIG. 2 is a schematic cut-away of the carcass portion.

In FIG. 1, numeral 1 is a carcass, numeral 2 a tread portion, numeral 3 an apex rubber, numeral 4 a tread surface and numeral 5 represents a center position in the widthwise direction of the tire.

The dimensions of tire carcass body are shown in the following Table 1.

In FIG. 2, numeral 6 is rubber interposed between the carcass plies and numeral 7 is a cord constituting the carcass with ho being the cord diameter and H₁ through h₅ the spacing between adjacent cords.

TABLE 1

|  |  |  | Conventional tire | Tire according to the invention |
|---|---|---|---|---|
| Carcass ply |  | Denier | 1,260 d/2 | 1,890 d/2 |
|  |  | Number of plies | 8 | 6 |
|  |  | hm/ho | 0.55 | 0.40 |
|  |  | hm′/ho | 0.99 | 0.45 |
| Rubber between plies |  | average iodine adsorption value | 30 (mg/g) | 44 (mg/g) |
|  | Carbon black | average DBP absorption value | 87 (ml/100 g) | 114 (ml/100 g) |
|  |  | compounding quantity | 23 wt. % | 30 wt. % |
|  |  | E′ | $4.0 \times 10^7$ dyne/cm² (100° C.) | $7.5 \times 10^7$ dyne/cm² (100° C.) |
|  |  | tan δ | 0.08 (100° C.) | 0.095 (100° C.) |
|  |  | Tensile strength | 70 kg/cm² (100° C.) | 120 kg/cm² (100° C.) |

Then, the durability of the test tire having the above dimensions of carcass body was tested under the following conditions to obtain a result as shown in the following Table 2, wherein the numerical values of the durability is based on a numerical value of 100 for the conventional tire.

| Test conditions: |  |
|---|---|
| Rim | 7.00 T |
| Inner pressure | 6.75 kg/cm² |
| Load per tire | 112% of standard load defined by JIS |
| Travelling distance | 55,000 km |

TABLE 2

|  | Wear resistance | Fatigue resistance | Tire weight (kg) |
|---|---|---|---|
| Conventional tire | 100 | 100 | 42.6 |
| Tire according to the invention | 100 | more than 100 | 39.8 |

According to the invention, the effective weight-saving of tire can be realized without causing the degradation of wear resistance and fatigue resistance as apparent from the results of Table 2.

What is claimed is:

1. A light tire body for heavy vehicles comprising, a bias-structured carcass composed of rubberized plies each including thick organic fiber cords having a cord diameter equal to or larger than that of nylon 1,890 d/2, rubber interposed between said carcass plies having a thickness corresponding to hm/ho $\leq$ 0.5 where, hm is an average rubber gauge between said plies at a center position in the widthwise direction of the tire, and ho is a diameter of said thick cord and being prepared from a compounding recipe of at least one rubber ingredient selected from natural rubber and diene synthetic rubbers, a softener, an organic vulcanization accelerator and sulfur as well as at least 30% by weight of carbon black having an average iodine adsorption value of 40–90 mg/g and an average dibutyl phthalate absorption value of 60–140 ml/100 g, and said rubber having a dynamic modulus of elasticity at 100° C. under 2% elongation of not less than $6.0 \times 10^7$ dyne/cm$^2$, a dynamic loss angle the tangent of which is not more than 0.095 and a tensile strength of not less than 100 kg/cm$^2$ as properties after vulcanization; and said carcass being provided with an apex rubber for stiffening a turnup portion of the carcass and a ratio in the dynamic modulus of elasticity of said apex rubber to said rubber interposed between the plies is within a range of 0.9–1.3.

2. A light tire body as claimed in claim 1, wherein said rubber has a thickness corresponding to $0.2 \leq hm'/ho \leq 0.7$ where hm' is an average rubber gauge between two or three plies from the outermost ply toward the inside of said carcass at the center position in the widthwise direction of the tire and ho is a diameter of said thick cord.

* * * * *